United States Patent [19]

Nakao et al.

[11] Patent Number: 4,653,352
[45] Date of Patent: Mar. 31, 1987

[54] AUTOMATIC TRANSMISSION SYSTEM FOR AUTOMOBILES HAVING HYDRAULIC AND ELECTRONIC CONTROL SYSTEMS

[75] Inventors: Toshiyuki Nakao, Chiryu; Tamotsu Furukawa, Yokohama; Masanori Mori, Chiryu, all of Japan

[73] Assignee: Aisin Seiki Kabushiki Kaisha, Kariya, Japan

[21] Appl. No.: 683,805

[22] Filed: Dec. 19, 1984

[30] Foreign Application Priority Data

Feb. 20, 1984 [JP] Japan .................. 59-031194
Feb. 22, 1984 [JP] Japan .................. 59-033044
Feb. 22, 1984 [JP] Japan .................. 59-033043

[51] Int. Cl.⁴ .................. B60K 20/10; B60K 20/12; B60K 20/14
[52] U.S. Cl. .................. 74/866; 74/335; 74/337
[58] Field of Search ............ 74/866, 867, 335, 336 R, 74/337; 192/0.044, 0.052, 0.055, 0.08, 0.09, 0.092, 0.094

[56] References Cited

U.S. PATENT DOCUMENTS

| | | | |
|---|---|---|---|
| 2,017,776 | 10/1935 | Thurber | 74/335 X |
| 2,137,953 | 11/1938 | Rowley | 74/335 X |
| 2,137,959 | 11/1938 | Turek | 74/335 X |
| 2,137,961 | 11/1938 | Vorech | 74/335 X |
| 2,200,013 | 5/1940 | Sanford | 74/335 X |
| 2,451,160 | 10/1948 | Eaton | 74/335 |
| 3,386,523 | 6/1968 | Ruhl | 192/0.094 X |
| 3,511,116 | 5/1970 | Detra | 74/337 X |
| 3,791,239 | 2/1974 | Schreiner | 74/336 X |
| 3,808,738 | 5/1974 | Siebers et al. | 74/336 X |
| 3,938,634 | 2/1976 | Frost | 74/337 X |
| 4,262,783 | 4/1981 | Scarrott et al. | 192/0.09 |
| 4,350,234 | 9/1982 | Suga et al. | 192/0.094 X |
| 4,361,060 | 11/1982 | Smyth | 74/866 |
| 4,499,793 | 2/1985 | Jow et al. | 74/866 |

FOREIGN PATENT DOCUMENTS 0085498 8/1983 European Pat. Off. ............. 74/335
1356862 12/1964 France .................. 74/867

OTHER PUBLICATIONS

A Fully Automatic Vehicle Transmission Using a Layshaft Type Gearbox, by Harry Webster (Automotive Products Ltd.), Publication No. 810104, copyright 1981, Society of Automotive Engineers, Inc. (Order No. 0148-7191/81/0223-0104).

Primary Examiner—Leslie Braun
Assistant Examiner—D. Wright
Attorney, Agent, or Firm—Burns, Doane, Swecker & Mathis

[57] ABSTRACT

An automatic transmission system in an automobile having an engine, a brake, a throttle valve, a shift lever, a clutch, and transmission gears associated with synchromesh systems. The automatic transmission system includes a throttle actuator for actuating the throttle valve, a clutch actuator for actuating the clutch, a gear selection actuator for selectively actuating the synchromesh systems to shift the transmission gears, a fluid-pressure control unit for applying working fluid pressures to the gear selection actuator, and an electronic control unit for issuing control signals to the throttle actuator, the clutch actuator, and the fluid-pressure control unit in response to detected signals indicative of a rotational speed of the engine, an operation of the brake, an operative position of the throttle valve, a selected position of the shift lever, a releasing position of the clutch, and a speed of travel of the automobile.

2 Claims, 9 Drawing Figures

AUTOMATIC TRANSMISSION SYSTEM FOR AUTOMOBILES HAVING HYDRAULIC AND ELECTRONIC CONTROL SYSTEMS

BACKGROUND OF THE INVENTION

The present invention relates to an automatic transmission system with no clutch pedal for use on automobiles such as passenger cars, large-size trucks, and buses, and more particularly to such an automatic transmission system having a throttle actuator, a clutch actuator, a gear shift or selection actuator, a pump mechanism for producing a working pressure for actuating the gear shift actuator, and an electronic control unit for producing control signals to control these actuators in response to detected signals indicative of various parameters such as an engine speed, a brake operation, a throttle position, a shift lever position, a clutch releasing position, and a car speed.

One known automatic transmission system of the type described is disclosed in Japanese Laid-Open Patent Publication No. 58-170955. The disclosed prior automatic transmission system includes an electronic control unit for producing control signals to adjust a throttle valve opening, connect and disconnect a clutch, and change transmission gears in response to detected signals representative of an engine speed, a brake operation, a throttle position, a shift lever position, a clutch releasing position, and a car speed. The automatic transmission system also has a hydraulic gear shift or selection actuator for shifting transmission gears, and a pump mechanism for producing a working pressure for actuating the hydraulic gear shift actuator.

The hydraulic gear selection actuator includes a double-acting cylinder with a piston slidably disposed therein and defining two cylinder chambers in the cylinder. By introducing a hydraulic pressure alternatively in the cylinder chambers, the piston is moved in two directions to provide two piston positions. When the same hydraulic pressure is applied simultaneously to the cylinder chambers, the piston can be set to a central position between the two positions. However, since the piston is moved only under hydraulic pressure, the central position can only be established by controlling the hydraulic pressure while checking the piston position with a detector. The prior gear shift actuator is therefore advantageous in that the detector mechanism is necessary, the piston tends to be displaced out of the central position due to a slight difference between the pressures in the cylinder chambers, and the piston does not respond quickly.

There are three shifting shafts for actuating synchromesh systems for the transmission gears, and the shifting shafts are selectively engaged by a single select lever actuated by the gear selection actuator. The gear selection actuator is controlled by the output signal from the electronic control unit to operate the select lever to shift the gears. Once a gear shift lever is shifted to a desired position, the electronic control unit processes the detected signals indicative of the engine speed, the throttle position, the car speed, and the other parameters for automatically connecting and disconnecting the clutch and shifting the gears, without requiring the driver to depress a clutch pedal. The prior art arrangement is however disadvantageous for the following reasons: Since the single gear select lever is coupled to the single gear selection actuator and selectively engages or selects one of the shifting shafts, operation of the synchromesh systems requires the gear selection actuator first to move the gear select lever in a selecting direction to select a shifting shaft, and then to move the shifting shaft in a shifting direction. This two-step process results in a failure to achieve quick gear changing operation. As a consequence, the driving force from the engine is applied to drive wheels with a delayed response, so that no rapid acceleration and deceleration will be effected.

Another problem with the prior art automatic transmission system is that a high hydraulic pressure (for example about 140 kg/cm$^2$ in the cylinder chambers) is required to actuate the synchromesh systems. When the shift shaft is kept actuated under such a high pressure, the synchromesh systems are subjected to quick wear on engaging components thereof and hence is poor in durability.

SUMMARY OF THE INVENTION

It is an object of the present invention to provide an automatic transmission system for automobiles which includes a hydraulic gear shift or selection actuator having a piston which can reliably and quickly set to a central position without the need for a detector.

Another object of the present invention is to provide an automatic transmission system for automobiles which includes a hydraulic gear selection actuator operable in a shifting direction only for shifting gears quickly to increase the response with which an engine drive power is applied to wheels for rapid acceleration and deceleration.

Still another object of the present invention is to provide an automatic transmission system for automobiles which includes synchromesh systems operating under two-step pressure control in which the synchromesh systems are actuated under a high hydraulic pressure (about 140 kg/cm$^2$, for example) and remains actuated against disengagement under a relatively low hydraulic pressure (about 50 kg/cm$^2$, for example), so that the synchromesh systems will have reduced wear and increased durability.

According to the present invention, there is provided an automatic transmission system in an automobile having an engine, a brake, a throttle valve, a shift lever, a clutch, and transmission gears associated with synchromesh systems, the automatic transmission system comprising a throttle actuator for actuating the throttle valve, a clutch actuator for actuating the clutch, a gear selection actuator for selectively actuating the synchromesh systems to shift the transmission gears, a fluid-pressure control unit for applying working fluid pressures to the gear selection actuator, and an electronic control unit for issuing control signals to the throttle actuator, the clutch actuator, and the fluid-pressure control unit in response to detected signals indicative of a rotational speed of the engine, an operation of the brake, an operative position of the throttle valve, a selected position of the shift lever, a releasing position of the clutch, and a speed of travel of the automobile.

The fluid-pressure control unit includes a pump mechanism for generating a fluid pressure, a main passage connected between the pump mechanism and the gear selection actuator, and a valve mechanism actuatable in response to gear shift control and completion signals from the electronic control unit for controlling a fluid pressure in the main passage to be applied under two selective higher and lower fluid pressures to the gear selection actuator.

The gear selection actuator comprises fluid cylinders with pistons slidably disposed respectively in cylinder tubes thereof, the gear transmission having a transmission case in which the cylinder tubes are defined, and shifting shafts coupled respectively with the pistons for actuating the synchromesh systems, respectively, the pistons being normally urged to move to prescribed positions under the bias of springs acting thereon and actuatable under fluid pressures selectively supplied from the fluid-pressure control unit into the fluid cylinders.

Alternatively, the gear selection actuator comprises double-acting hydraulic cylinders each comprising a cylinder tube, a piston slidably disposed therein and composed of a pair of relatively movable piston members defining a circumferential groove therebetween, the piston members being slidably movable in the cylinder tube independently of each other in response to fluid pressures supplied into the cylinder tube, a pair of seats disposed in the circumferential groove between the piston members, respectively, and a spring disposed in the circumferential groove between the seats and normaly urging the seats apart from each other against the piston members, respectively, the seats having outer peripheral portions larger in diameter than the piston, the cylinder tube having steps engageable respectively with the outer peripheral portions of the seats for limiting axial movement of the seats.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Like or corresponding parts are denoted by like or corresponding parts throughout several views.

Figure 1:
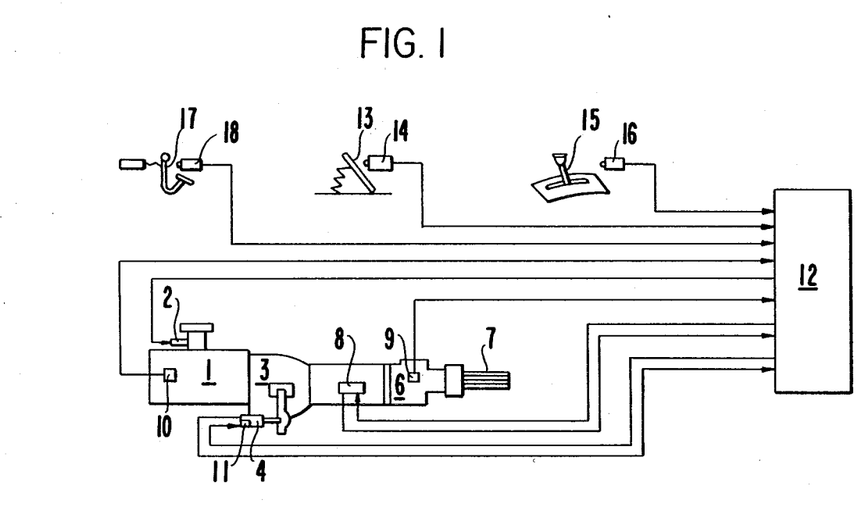
FIG. 1 is a schematic diagram of an automatic transmission system according to the present invention.

FIG. 1 shows an automatic transmission system including an engine 1, a throttle actuator 2, a clutch 3, a clutch actuator 4, a tranmission 6, a propeller shaft 7, a gear shift or selection actuator 8 mounted on the transmission 6, a car speed sensor 9 disposed in the transmission 6, an engine speed sensor 10 mounted on the engine 1, and a clutch actuator sensor 11 for detecting the interval of movement of the clutch actuator 4. The automatic transmission system has an electronic control unit 12 for producing control signals to operate the throttle actuator 2, the clutch actuator 4, and the gear selection actuator 8 for automatic gear shifting to achieve an automobile running mode dependent on input signals applied from a throttle position sensor 14 associated with an accelerator pedal 13, a shift lever position sensor 16 associated with a shift lever 15, and a brake sensor 18 associated with a brake pedal 17.

Figure 4:
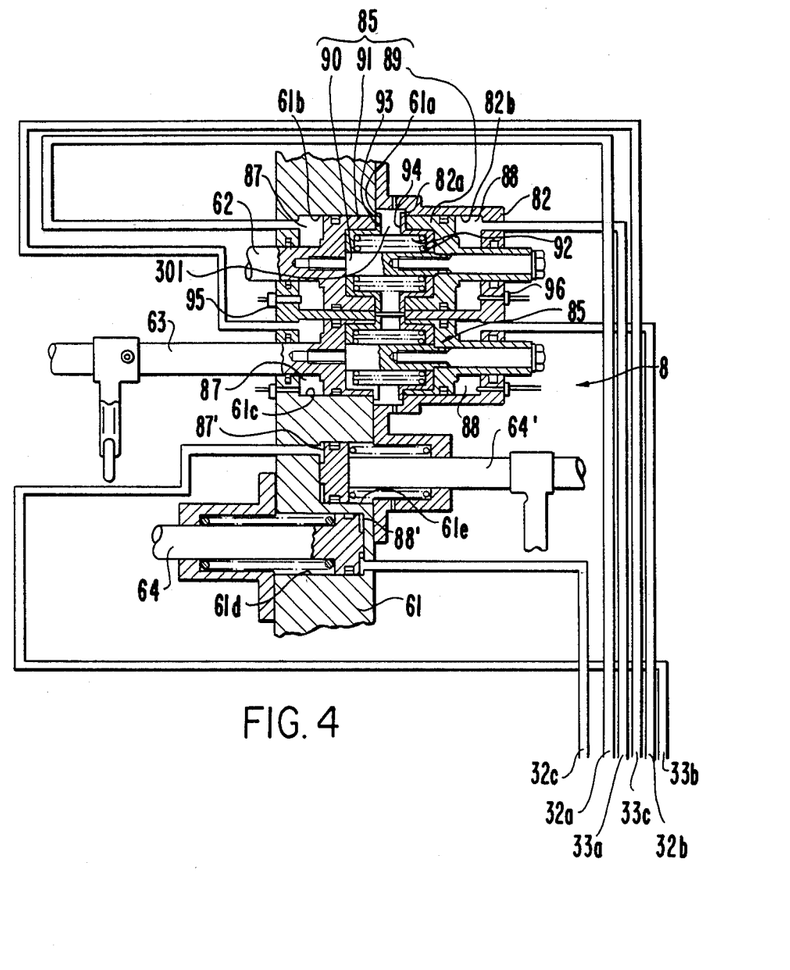
FIG. 4 is a cross-sectional view of a gear selection actuator according to an embodiment of the present invention.

The gear selection actuator 8 is illustrated in detail in FIG. 4. The transmission 6 has a transmission case 61 defining in its wall cylinder bores 61b, 61c, 61d, 61e in which there are slidably disposed pistons integral with shifting shafts 62, 63, 64, 64' coupled by forks with synchromesh systems for transmission gears. The shifting gears 62, 63, 64, 64' are axially shiftable for selecting 1st and 2nd, 3rd and 4th, 5th, and reverse gears, respectively.

The piston, designated at 85, integral with the shift shaft 62 is composed of a first piston member 91 slidable in the cylinder bore 61b and defining a cylinder chamber 87 on one side thereof, a second piston member 89 slidable in a cylinder bore 82b in a cover 82 fixed to the case 61 and defining a cylinder chamber 88 on one side thereof, and a rod 90 interconnecting the first and second piston members 91, 89, there being a circumferential groove 301 defined between the first and second piston members 91, 89. Seats 93, 94 are resiliently held against confronting surfaces of the piston members 89, 91 under the bias of a compression spring 92 interposed therebetween. The seats 93, 94 have outer peripheral edges held respectively against a step 61a of the case 61 and a step 82a of the cover 82 so that the seats 93, 94 are axially movable in a limited interval. The case 61 and the cover 82 jointly constitute a cylinder tube. The cylinder chamber 87 is held in communication with a shifting valve 32 (FIG. 2) through a passage 33a, and the cylinder chamber 88 is held in communication with a shifting valve 33 through a passage 33a.

The piston identical with the shifting shaft 83 is of a construction identical to the above piston 85, and has two cylinder chambers, one being connected through a passage 33c to the shifting valve 33 and the other through a passage 32b to the shifting valve 32.

The pistons integral respectively with the shifting shafts 64, 64' and the cylinder bores 61d, 61e jointly define cylinder chambers 88', 87' communicating with the shifting valves 32, 33 through the passages 32c, 33b.

Figure 2:
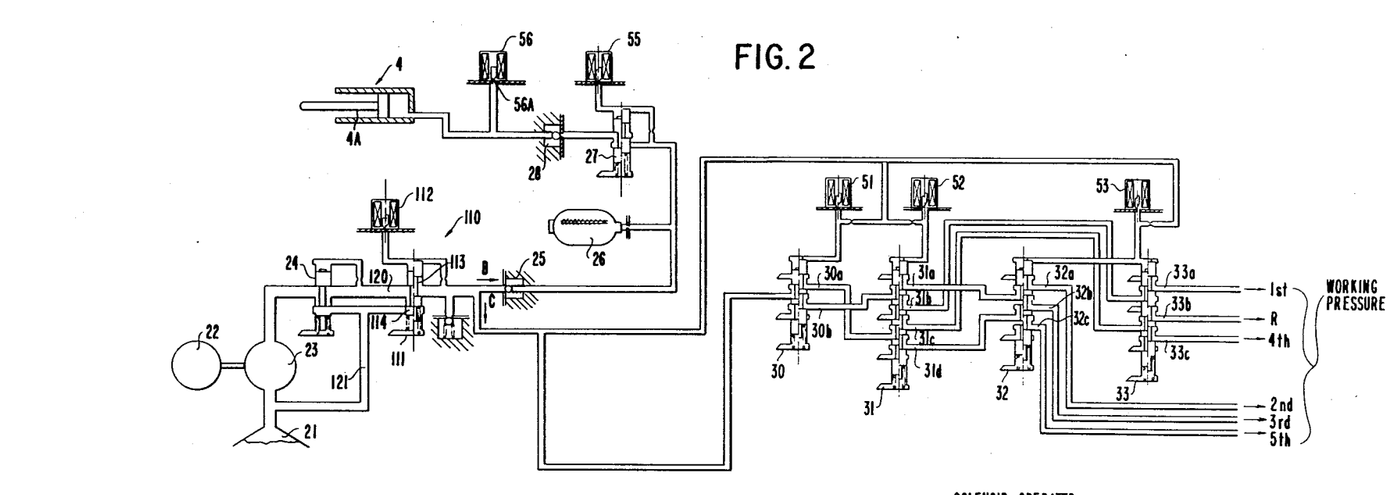
FIG. 2 is a circuit diagram of a hydraulic control circuit for controlling a clutch actuator and a gear selection actuator.
Figure 3:
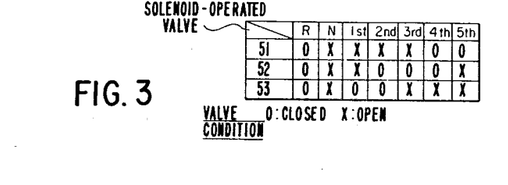
FIG. 3 is a table showing the relationship between gear positions and solenoid-operated valves.

FIG. 2 is illustrative of a hydraulic control circuit for the clutch actuator 4 and the gear selection actuator 8 (not shown in FIG. 2). Oil is supplied under pressure from a strainer 21 by an oil pump 23 driven by a motor 22 powered by a battery (not shown) is kept under a prescribed pressure by a first regulator valve 24 of a two-step control valve mechanism 110 which will be described in detail later on. Oil B under pressure from the control valve mechanism 110 is directed through a first check valve 25 toward the clutch actuator 4 and stored in an accumulator 26. When the electronic control unit 12 produces a control signal to disconnect the clutch, the control signal is applied to a solenoid 55 to depress a valve 27 through which the oil under pressure is delivered via a second check valve 28 into the clutch actuator 4, whereupon a piston 4A is moved to the left (FIG. 2) to disengage the clutch. Since the interval of movement of the piston 4A is detected by the clutch actuator sensor 11, the electronic control unit 12 detects when the clutch actuator 4 disconnects the clutch and issues a signal to the solenoid valve 55 to cause the valve 27 to close the passage between the accumulator 26 and the clutch actuator 4. When a signal for connecting the clutch is thereafter applied to a solenoid-operated valve 56, it is opened to allow the oil under pressure to be discharged through a hole 56A, thus connecting the clutch. The solenoid-operated valve is duty-controlled by the electronic control unit 12 while the electronic control unit 12 detects the amount of oil discharged from the clutch actuator 4 through the sensor 11 so that the clutch can be connected slowly to meet the throttle position, the car speed, and the shift lever position.

Oil C under pressure from the control valve mechanism 110 is supplied through solenoid-operated valves 51, 52, 53 and shift valves 30, 31, 32, 33 into the cylinder chambers 87, 88, 87', 88' of the gear selection actuator 8.

The control valve mechanism 110 is composed of the first regulator valve 24, a second regulator valve 2 connected in series with the first regulator valve 24, and a solenoid-operated valve 112. The second regulator valve 111 is responsive to a prescribed fluid pressure maintained by the first regulator valve 24 for controlling an output fluid pressure to be lower than the prescribed fluid pressure.

When the shift lever is in a neutral (N) position, the solenoid-operated valves 51, 52, 53 are not operated with the valves 30, 31, 32, 33 shifted upwardly in FIG. 2, so that the oil C under pressure is not supplied to any of the cylinder chambers 87, 88, 87', 88'. At this time, the pistons 85 are positioned as illustrated in FIG. 4.

When the electronic control unit 12 issues a control signal for shifting the gears from the N position to a first gear (1st) position, a valve 112a (FIG. 7) of the solenoid-operated valve 112 of the control valve mechanism 110 is opened to relieve the fluid pressure in a passage 120a branched by an orifice from a main passage 120a. A piston 113 is then moved upwardly (FIG. 7) under the force of a spring 115. The second regulator valve 111 is now in an inoperative position to transmit the fluid pressure as regulated by the first regulator valve 24, whereupon the the fluid pressure in the main passage 120 is increased (up to about 14 kg/cm$^2$ for example) to produce the oil C under pressure.

Figure 7:
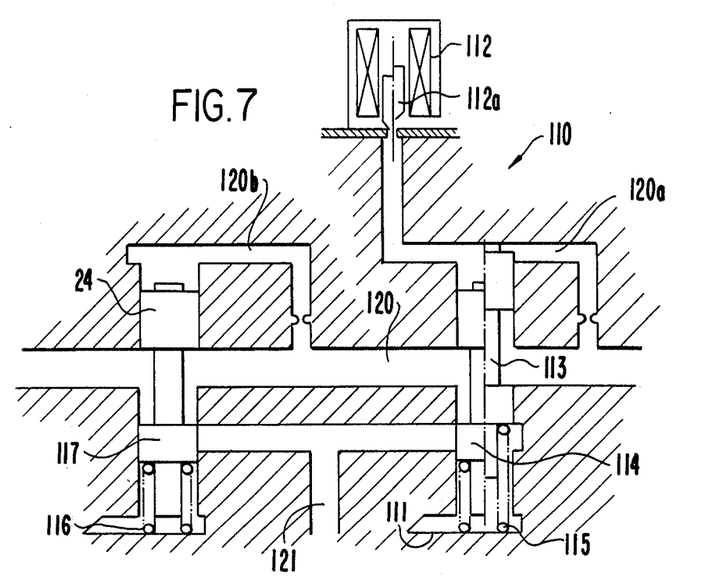
FIG. 7 is a cross-sectional view of a two-step control valve mechanism in FIG. 2.

The first regulator valve 24 is positionally balanced by the fluid pressure in a passage 120b branched by an orifice from the main passage 120 and a spring 116 acting on the first regulator valve 24. The first regulator valve 24 supplies the prescribed fluid pressure into the main passage 120 through controlled movement of a land 117 between the main passage 120 and a relief passage 121.

The signal from the electronic control unit 12 is also applied to the solenoid-operated valve 53 to close the same, whereupon the oil C under pressure depresses pistons of the valves 33, 32. The oil C under pressure is now allowed to flow from the valve 30 through passages 30b, 31b and the passage 33a as a 1st working fluid pressure to the cylinder chamber 88 in the cylinder (hereinafter referred to as "first cylinder") coacting with the shifting shaft 62 (FIG. 4) to move the piston 85 to the left. The oil pressure in the cylinder chamber 88 at this time is high (140 kg/cm$^2$ as described above). The shifting shaft 62 then shifts the gears into the 1st gear position. At this time, the seat 93 is held in the position of FIG. 4 by the step 61a, but the seat 94 is moved toward the seat 93 to allow the leftward movement of the piston 85. The first piston member 91 then engages a switch 95 to apply a signal indicative of completion of the selection of the 1st gear to the electronic control unit 12, whereupon the electronic control unit 12 connects the clutch in the manner described above. Simultaneously, the electronic control unit 12 applies a signal to the solenoid-operated valve 112 to close the valve 112a. The piston 113 of the second regulator valve 111 is then lowered against the spring 115 under the fluid pressure in the passage 120a to return the second regulator valve 111 to its operative position. Therefore, a land 114 of the piston 113 controls fluid communication between the main passage 120 and the relief passage 121 to keep the fluid pressure in the main passage 120 at a lower level (about 5 kg/cm$^2$ for example) than the fluid pressure as regulated by the first regulator valve 24. This lower fluid pressure is transmitted as the oil C into the cylinder chamber 88 in the first cylinder in which the fluid pressure is kept at about 50 kg/cm$^2$ for example). The spring force of the springs 92 in the gear selection actuator 8 is lower than the low fluid pressure in the cylinder chamber 88. Therefore, the piston 85 remains displaced to the left (FIG. 4) to keep the 1st gear position.

The gears can be shifted from the 1st gear position to a second gear (2nd) position as follows: When the electronic control unit 12 issues a signal for a gear shift from the 1st to the 2nd gear position, the clutch is first disconnected the manner described above, and the solenoid-operated valve 52 is closed while the solenoid-operated valve 53 remains closed. The oil C under pressure now depresses a piston of the valve 31. As a result, the oil C under pressure from the valve 30 flows through the passages 30b, 31a, 32a as a 2nd working pressure into the cylinder chamber 87 of the first cylinder. The oil C under pressure in the passage 31b is drained by the above movement of the piston of the valve 31 and will not be supplied to the cylinder chamber 88. Therefore, the piston 85 in the first cylinder is moved to the right (FIG. 4) under a differential pressure to cause the shifting shaft 62 to select the 2nd gear. At this time, the first piston member 91 disengages from the switch 95 and the second piston member 89 engages a switch 96 which is actuated to apply a signal indicative of completion of the selection of the 2nd gear to the electronic control unit 12, which then connects the clutch.

The piston 85 in the first cylinder operates in substantially the same manner as described above except that the seat 94 is held against the step 82a while the seat 93 is moved toward the seat 94.

While the gears are shifted from the 1st to the 2nd gear position, and are shifted between any other gear positions, the control valve mechanism 110 is operated in the same manner as described above in response to gear shift control and completion signals for thereby keeping the oil C selectively under high and low pressures.

Selection of other gear positions will be summarized as follows:

2nd to 3rd gear positions: The solenoid-operated valve 53 is opened in the 2nd gear position to allow the piston of the valve 33 to return upwardly. The oil C under pressure flows through the passages 30b, 31a, 32b as a 3rd working fluid pressure into the cylinder chamber 88 in a cylinder (hereinafter referred to as "second cylinder") coacting with the shifting shaft 63, which is then moved to the right to select the 3rd gear. At this time, the cylinder chambers 87, 88 in the first cylinder are drained and the piston 85 therein is moved to the neutral position shown in FIG. 4, so that the 2nd gear is released.

3rd to 4th gear positions: The solenoid-operated valve 51 is closed in the 3rd gear position to allow the piston of the valve 30 to be pushed downwardly. The oil C under pressure flows through the passages 30a, 31c, 33c as a 4th working fluid pressure into the cylinder chamber 87 in the second cylinder. At this time, the cylinder chamber 88 in the second cylinder is drained and the piston 85 therein is moved to the right in FIG. 4, so that the shifting shaft 63 is moved to release the 3rd gear and select the 4th gear.

4th to 5th gear positions: The solenoid-operated valve 52 is opened in the 4th gear position to allow the piston of the valve 31 to return upwardly. The oil C under pressure flows through the passages 30a, 31d, 32c as a 5th working fluid pressure into the cylinder chamber 88' defining the cylinder bore 61d coacting with the shifting shaft 64, which is then moved to the right to select the 5th gear. At this time, the cylinder chamber 87 in the second cylinder is drained and the piston 85 therein is moved to the neutral position shown in FIG. 4, so that the 4th gear is released.

For selecting the reverse (R) gear, all of the solenoid-operated valves 51, 52, 53 are closed to depress all of the pistons of the valves 30, 31, 32, 33. The oil C under pressure flows through the passages 30a, 31c, 33b as an R working fluid pressure into the cylinder chamber 87'defining the cylinder bore 61e coacting with the shifting shaft 64', which is then moved to the right (FIG. 4) to select the R gear.

As described above, the pistons 85 can automatically be returned accurately to their neutral positions under the action of the springs 92 when the cylinder chambers 87, 88 are drained, and no detector for detecting such neutral positions are required.

Figure 5:
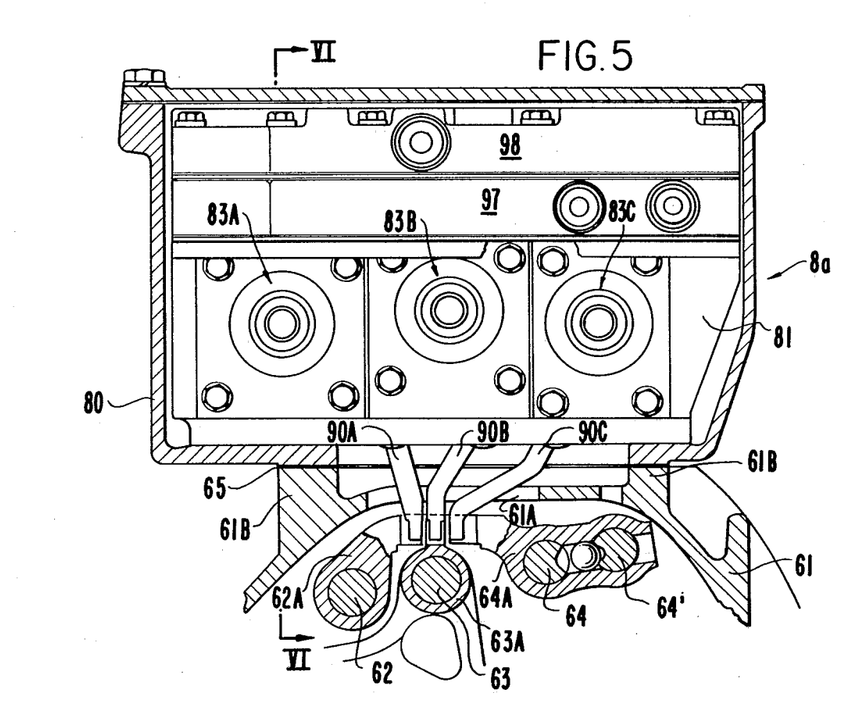
FIG. 5 is a cross-sectional view of a gear selection actuator according to another embodiment of the present invention, the gear selection actuator being combined with a gear transmission.
Figure 6:
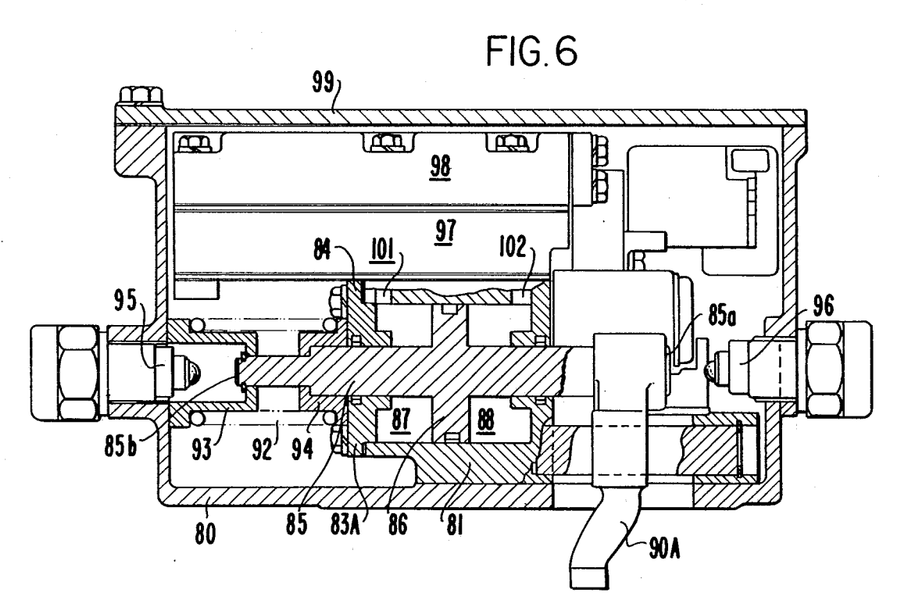
FIG. 6 is a cross-sectional view taken along line VI—VI of FIG. 5.

FIGS. 5 and 6 show a gear selection actuator 8a according to another embodiment of the present invention. The gear transmission 6 (FIG. 1) includes a transmission case 61 in which there are disposed shifting shafts 62, 63, 64, 64' connected to forks for actuating synchromesh systems (not shown) for transmission gears and to shifting heads 62A, 63A, 64A, the shifting shafts 64, 64' being coupled to the shifting head 64A. The shifting shafts 62, 63, 64, 64' are movable in a direction normal to the sheet of FIG. 5 for selecting 1st and 2nd, 3rd and 4th, and 5th and reverse gear positions, respectively. The transmission case 61 has a hole 61A defined therein and surrounded by an attachment seat 61B for the gear selection actuator 8a. The gear selection actuator 8a includes a housing 80 and a body 81 accommodated therein, the housing 80 being mounted through a sealing member 65 on the attachment seat 61B. The body 81 comprises three hydraulic cylinders 83A, 83B, 83C associated respectively with the shifting shafts 62, 63, 64 (64').

FIG. 6 shows the cylinder 83A only, but the other cylinders 83B, 83C are of the same construction as that of the cylinder 83A. The cylinder 83A contains a piston 85 slidably disposed therein and having a land 86 dividing the interior of the cylinder 83A into cylinder chambers 87, 88. The piston 85 has a shaft having one end 85a to which there is fixed a select lever 90A having a distal end extending through the hole 61A and engaging the shifting head 62A. The select levers 90B, 90C of the other cylinders 83B, 83C are held in engagement with the shifting heads 63A, 64A, respectively, as shown in FIG. 5. The shaft of the piston 85 has an opposite stepped end 85b held in engagement with seats or retainers 93, 94 between which a compression coil spring 92 is interposed, the seats 93, 94 being held against a cylinder cover 84 fixed to the body 81 and the housing 80, respectively. Switches 95, 96 are mounted on the housing 80 in confronting relation to the shaft ends 85b, 85a, respectively. Valve bodies 97, 98 in which the hydraulic control circuit of FIG. 2 is disposed and the solenoid-operated valves in FIG. 2 are mounted on the body 81. Oil passages 101, 102 communicating with the shifting valves illustrated in FIG. 2 are connected to the cylinder chambers 87, 88, respectively. The housing 80 is closed by a cover 99 to isolate the body 96, the valve bodies 97, 98, and the solenoid-operated valves from the atmosphere.

The cylinders 83A, 83B, 83C shown in FIG. 5 correspond respectively to the first cylinder, the second cylinder, and the cylinders having the cylinder chambers 61e, 61d. Therefore, the cylinders 83A, 83B, 83C are connected to the passages 32a, 33a, the passages 32b, 33c, and the passages 32c, 33b, respectively.

Operation of the gear selection actuator 8a is substantially the same as that of the gear selection actuator 8. However, the shifting shafts 62, 63, 64, 64' are not actuated directly by the piston shafts, but through the select levers 90A, 90B, 90C. When selecting the 5th gear, the oil C under pressure enters the cylinder chamber 88 in the cylinder 83C to move the piston 85 therein to the left in FIG. 6. When selecting the R gear, the oil C under pressure flows into the cylinder chamber 87 in the cylinder 83C to move the piston 85 therein to the right.

With the gear selection actuator 8a, the gears can be shifted to select gear positions by moving the select levers 90A through 90C only in the shifting direction.

Figure 8:
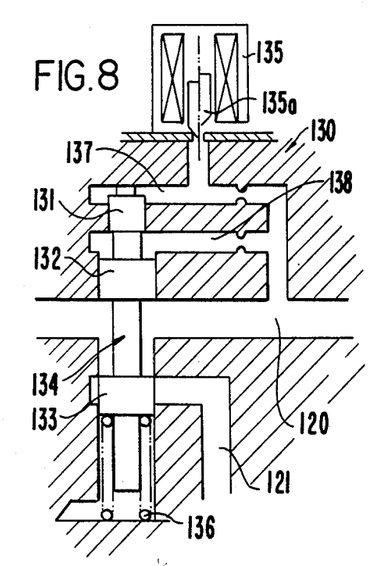
FIGS. 8 and 9 are cross-sectional views of control valve mechanisms according to other embodiments of the present invention.

FIG. 8 shows a control valve mechanism 130 according to still another embodiment of the present invention. The control valve mechanism 130 comprises a single regulator valve 134 having a smaller-diameter land 131 and larger-diameter lands 132, 133, and a solenoid-operated valve 135. The valve 134 is normally urged to move upwardly (FIG. 8) by a spring 136. The smaller-diameter land 131 is subjected to a fluid pressure in a passage 137 branched by an orifice from a main passage 120, while the larger-diameter land 132 is subjected to a fluid pressure in a passage 138 branched by an orifice from the main passage 120. When a signal indicative of a gear shift is applied by the electronic control unit 12 (FIG. 1) to the solenoid-operated valve 135, a valve 135a thereof is opened to release the fluid pressure in the passage 137, whereupon the regulator valve 134 is positionally balanced by the fluid pressure in the passage 138 acting on the difference between areas of the lands 131, 132 and the spring 136. The land 133 now controls fluid communication between the main passage 120 and a relief passage 121 to increase the fluid pressure in the main passage 120 to a higher level than when the valve 135a is closed. When a gear shift completion signal is applied by the electronic control unit 12 to the solenoid-operated value 135, the value 135a is closed. The fluid pressures in the passages 137, 138 act on the lands 131, 132 to shift the regulator valve 134 downwardly, thus reducing the fluid pressure in the main passsage 120 under the control of the land 133.

Figure 9:
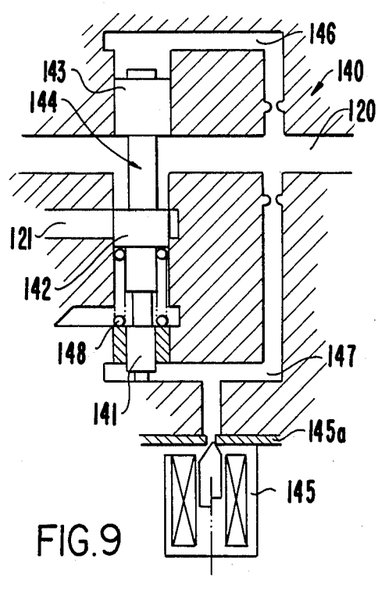

FIG. 9 shows a control valve mechanism 140 according to a still further embodiment of the invention. The control valve mechanism 140 comprises a single regulator valve 144 having a smaller-diameter land 141 and larger-diameter lands 142, 143, and a solenoid-operated valve 145. The regulator valve 144 is urged to move downwardly under the fluid pressure applied to the land 143 from a passage 146 branched by an orifice from a main passage. When a gear shift signal is applied by the electronic control unit 12 to the solenoid-operated valve 145, a valve 145a thereof is closed. The regulator valve 134 is then positionally balanced by the fluid pressure applied to the land 143 from the passage 146, the fluid pressure acting on the land 141 from a passage 147 branched by an orifice from the main passage 120, and a spring 148. The land 142 now controls fluid communication between the main passage 120 and a relief passage 121 to increase the fluid pressure in the main passage 120. When a gear shift completion signal is applied by the electronic control unit 12 to the solenoid-operated valve 145, the valve 145a is opened to relieve the fluid pressure in the passage 147. Since no pressure is applied to the land 141, the regulator valve 144 is lowered to reduce the fluid pressure in the main passage 120.

Although certain preferred embodiments have been shown and described, it should be understood that many changes and modifications may be made therein without departing from the scope of the appended claims.

What is claimed is:

1. An automatic transmission system in an automobile having an engine, a brake, a throttle valve, a shift lever, a clutch, and transmission gears associated with synchromesh systems, said automatic transmission system comprising:

(a) a throttle actuator means for actuating the throttle valve;
(b) a clutch actuator means for actuating the clutch;
(c) a gear selection actuator means for selectively actuating the synchromesh systems to shift the transmission gear;
(d) a fluid pressure control unit means for applying working fluid pressures to said gear selection actuator; and
(e) an electronic control unit means for transmitting control signals to said throttle actuator means, said clutch actuator means, and said fluid-pressure control unit means in response to detected signals indicative of a rotational speed of the engine, an operation of the brake, an operative position of the throttle valve, a selected position of said shift lever, a releasing position of the clutch, and a speed of travel of the automobile;

wherein said fluid-pressure control unit means includes a pump mechanism for generating a fluid pressure, a main passage connected between said pump mechanism and said gear selection actuator means, and a valve mechanism actuatable in response to gear shift control and completion signal from said electronic control unit means for controlling a fluid pressure in said main passage to be applied under two selective higher and lower fluid pressures to said gear selection actuator means.

2. An automatic transmission system in an automobile having an engine, a brake, a throttle valve, a shift lever, a clutch, and transmission gears associated with synchromesh systems, said automatic transmission system comprising;

(a) a throttle actuator means for actuating the throttle value;
(b) a clutch actuator means for actuating the clutch;
(c) a gear selection actuator means for selectively actuating the synchromesh systems to shift the transmission gears;
(d) a fluid pressure control unit means for applying working fluid pressures to said gear selection actuator; and
(e) an electronic control unit means for transmitting control signals to said control actuator means, said clutch actuator means and said fluid-pressure control unit means in response to detected signals indicative of a rotational speed of the engine, and operation of the brake, and operative position of the throttle valve, a selected position of said shift lever, a releasing position of the clutch, and a speed of travel of the automobile;

wherein said gear selection actuator means comprises double-acting hydraulic cylinders each comprising a cylinder tube, a piston slidably disposed therein and composed of a pair of relatively movable piston members defining a circumferential groove therebetween, said piston members being slidably movable in said cylinder tube independently of each other in response to fluid pressures supplied into said cylinder tube, a pair of seats disposed in said circumferential groove between said piston members, respectively, and a spring disposed in said circumferential groove between said seats and normally urging said seats apart from each other against said piston members, respectively, said seats having outer peripheral portions larger in diameter than said piston, said cylinder tube having steps engagable respectively with said outer peripheral portions of said seats for limiting axial movement of said seats.

* * * * *